(12) United States Patent
Natarajan et al.

(10) Patent No.: US 7,711,859 B2
(45) Date of Patent: May 4, 2010

(54) FACILITATING THE CONFIGURATION OF NEW PCI DEVICES DURING POST

(75) Inventors: Sivagar Natarajan, Norcross, GA (US); Shailesh Patel, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 331 days.

(21) Appl. No.: 11/205,346

(22) Filed: Aug. 17, 2005

(65) Prior Publication Data

US 2007/0043882 A1  Feb. 22, 2007

(51) Int. Cl.
*G06F 3/00* (2006.01)
(52) U.S. Cl. .................... 710/8; 710/10; 713/1
(58) Field of Classification Search .......... 710/8, 710/10; 713/1
See application file for complete search history.

(56) References Cited

U.S. PATENT DOCUMENTS

| 5,579,529 | A  | * | 11/1996 | Terrell et al. | 710/8 |
| 6,145,021 | A  | * | 11/2000 | Dawson et al. | 710/8 |
| 6,961,791 | B2 | * | 11/2005 | Cepulis | 710/104 |
| 7,263,605 | B2 | * | 8/2007 | Rothman et al. | 713/2 |
| 2003/0074491 | A1 | * | 4/2003 | Cepulis | 710/2 |
| 2004/0109017 | A1 | * | 6/2004 | Rothman et al. | 345/735 |
| 2006/0184794 | A1 | * | 8/2006 | Desselle et al. | 713/166 |

OTHER PUBLICATIONS

Jeff Tyson, "How BIOS Works" Apr. 3, 2003, howstuffworks, http://web.archive.org/web/20030403001613/http://computer.howstuffworks.com/bios3.htm.*

* cited by examiner

*Primary Examiner*—Eron J Sorrell
(74) *Attorney, Agent, or Firm*—Hope Baldauff Hartman, LLC

(57) ABSTRACT

Initialization and configuration modules are added to a POST- (power-on setup test) routine. If the initialization module detects new PCI devices in a system, this module determines whether this new device includes an Optional ROM (OP ROM) adhering to the PCI 3.0 specification, and whether the OP ROM provides a configuration utility. If so, this module identifies the device and its configuration utility, and locates the OP ROM. The initialization module then initializes the new device, but does not configure it. The initialization module similarly initializes any additional new devices, and builds a combination configuration utility menu listing these new devices. In turn, the configuration module enables a user to select from the menu whether to configure new devices using their provided configuration utilities, or using BIOS setup routines. The menu may also include an EXIT entry that exits the menu.

10 Claims, 4 Drawing Sheets

COMBINATION
CONFIGURATION MENU

<PCI DEVICE NAME> <CONFIG UTILITY NAME>

<PCI DEVICE NAME> <CONFIG UTILITY NAME>

<PCI DEVICE NAME> <CONFIG UTILITY NAME>

<PCI DEVICE NAME> <CONFIG UTILITY NAME>

<PCI DEVICE NAME> <CONFIG UTILITY NAME>

BIOS SETUP

EXIT

Fig. 3

FACILITATING THE CONFIGURATION OF NEW PCI DEVICES DURING POST

FIELD OF THE INVENTION

This invention relates to configuring a PCI device during the power on setup test (POST) of a personal computing system. More particularly the invention relates to making use of configuration utilities provided in an optional ROM with the PCI device in accordance with the PCI Firmware Specification 3.0 to simplify the configuration of new PCI devices added to a personal computing system.

BACKGROUND OF THE INVENTION

When personal computing systems power-on they use a power-on setup test (POST) routine. Each computing device in the computing system is powered-on, setup for operation based on previous configuration information, and tested. If all devices come up and test properly the computing programs in the firmware of the computing system hand off control of the system to the operating system.

During the POST operations a new peripheral device not previously initialized and configured will be detected, and the POST routine will be interrupted while configuration routines for the peripheral device take place. Because the configuration of new peripheral devices interrupts the POST routine, the POST routine may be significantly delayed if there are a number of peripheral devices newly attached to the computing system.

To deal with this interruption and delay of the POST routine, a PCI (Peripheral Component Interconnect) Firmware Specification standard was agreed to by industry representatives. In version 3.0 of this standard the PCI device will carry with it an OP ROM containing a configuration utility.

There is still a need for the POST routine to manage the initialization and configuration PCI devices adhering to this PCI firmware specification 3.0.

SUMMARY OF THE INVENTION

In accordance with the invention the above and other problems have been solved by adding an initialization module to the POST routine and adding a configuration module to the POST routine. The initialization module detects the presence of a new PCI device in the computing system. If there is a new PCI device, the initialization module detects whether this PCI device has an Optional ROM (OP ROM) and whether the OP ROM includes a configuration utility that can be separately identified for use in a menu. If the OP ROM includes such a utility, the initialization module collects information identifying the PCI device, its configuration utility, a pointer to the configuration utility in the OP ROM, and the location of the OP ROM. The new PCI device is then initialized but not configured. The initialization module repeats these operations for all new PCI devices. In the process this initialization module builds a list of PCI device configurations to be performed. This list is saved for later use as a combination configuration utility menu.

After all new PCI devices have been initialized the configurations module manages the configurations of the initialized PCI devices and provides the user a combination configuration utility menu display. From this menu display the user may select which PCI device configuration utility will be used to configure a new device. This configuration utility menu may also include a BIOS SETUP entry which allows the BIOS setup routines in POST routine of the computing system to configure one or more of the new PCI devices. Further the combination configuration utility menu may include an EXIT entry allowing the user to exit the menu after the PCI device configurations have been completed or if the user wishes to bypass some of the configurations.

The great utility and advantage of the invention is that it gives the user of the computing system control of the configuration process of all of the new PCI devices and collects configuration utilities so as to execute them at a single interrupt of the POST routine.

These and various other features as well as advantages, which characterize the present invention, will be apparent from a reading of the following detailed description and a review of the associated drawings.

BRIEF DESCRIPTION OF THE DRAWINGS

FIG. 3 shows the combination configuration menu built by the initialization module.

DETAILED DESCRIPTION OF PREFERRED EMBODIMENTS OF THE INVENTION

Figure 1:
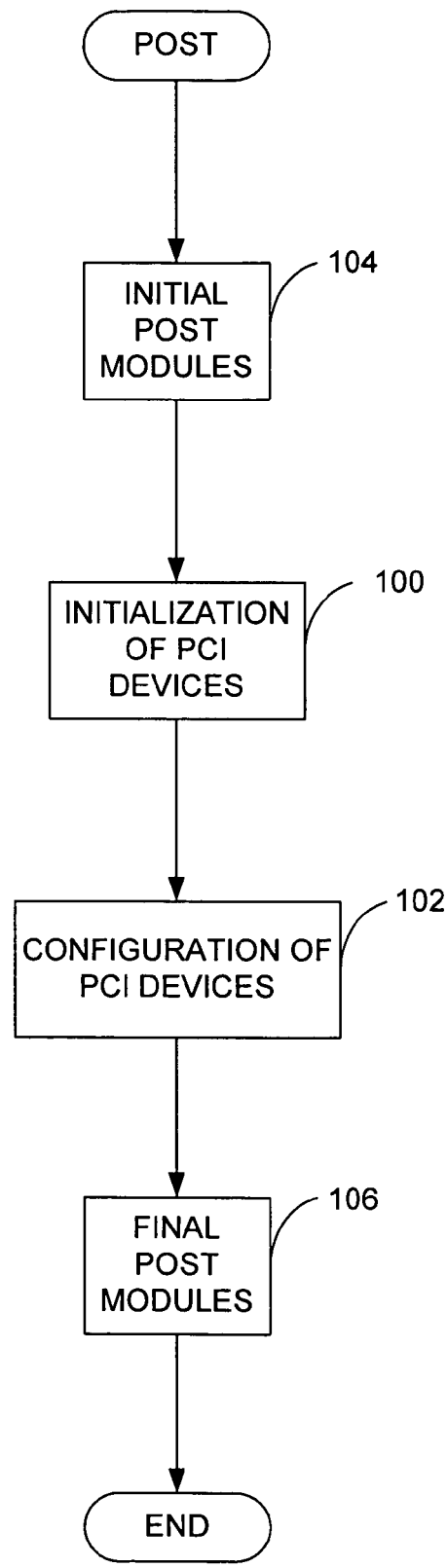
FIG. 1 shows a preferred embodiment of the invention with the initialization module and the configuration module included as part of the POST routine.

FIG. 1 illustrates the operational flow of the POST routine. More particularly, the figure illustrates the incorporation of the initialization module 100 and the configuration module 102 into the POST routine. The POST routine will begin with initial POST modules 104 bringing up primary computing subsystems, setting these subsystems up according to prior configurations and testing these computing subsystems. After the primary subsystems have been powered-on and tested by the initial modules 104 the initialization module 100 will detect new PCI devices that have been added to the computing system. If new PCI devices are detected, then the initialization module will initialize these devices and collect a list of their configuration utilities. This list will become the combination configuration menu shown in FIG. 3 and subsequently used by the configurations module 102.

The initialization module 100 detects the presence of a new PCI device in the computing system. If there is a new PCI device, the initialization module detects whether the new PCI device has an OP ROM (OP ROM) that meets the PCI 3.0 specification and whether the OP ROM includes a configuration utility. The initialization module 100 collects information identifying the PCI device, its configuration utility, a pointer to the configuration utility, and an address or location of the OP ROM at the PCI device. The new PCI device is then initialized but not configured. The initialization module repeats these operations for all new PCI devices. While performing these operations, the initialization module 100 builds a list of PCI device configuration utilities to be performed after the PCI device is initialized. This list is saved for later use as a combination configuration utility menu as shown in FIG. 3.

Sometime after all new PCI devices have been initialized, the configurations module 102 manages the configurations of the initialized PCI devices and displays to the user the combination configuration utility menu. From this menu, the user may select a PCI device configuration utility to be used to configure the new device. This configuration utility menu may also include a BIOS setup selection which allows the BIOS setup routines in the computing systems to configure one or more of the new PCI devices. Further, the combination configuration utility menu will include an exit selection allowing the user to exit the menu after the PCI device configurations have been completed or if the user wishes to bypass some of the configurations.

Although not shown, there may be additional POST modules between the initialization module 100 and the configurations module 102. The configurations module 102 can be triggered in a number of ways. A pre-defined hot key can be pressed by the user to trigger the operations of the configurations module 102. There are several alternatives for the triggering of the configurations module along with alternatives for operations by this configurations module. In one preferred embodiment a delete key may be used as the hot key, and the combination configurations utilities menu includes a BIOS setup selection as well as the configuration utility selection for the particular PCI device. In an alternative embodiment another hot key, such as an F7 function key, might be used, and in this embodiment the combination configuration utility menu would only include the configuration utilities provided by the PCI devices. In yet another embodiment, the configurations module might be automatically triggered by the completion of the initialization module 100.

After the program control returns from the configurations module 102 to the POST routine, the final POST modules 106 are executed to complete the power on and setup test of the computing system.

Figure 2:
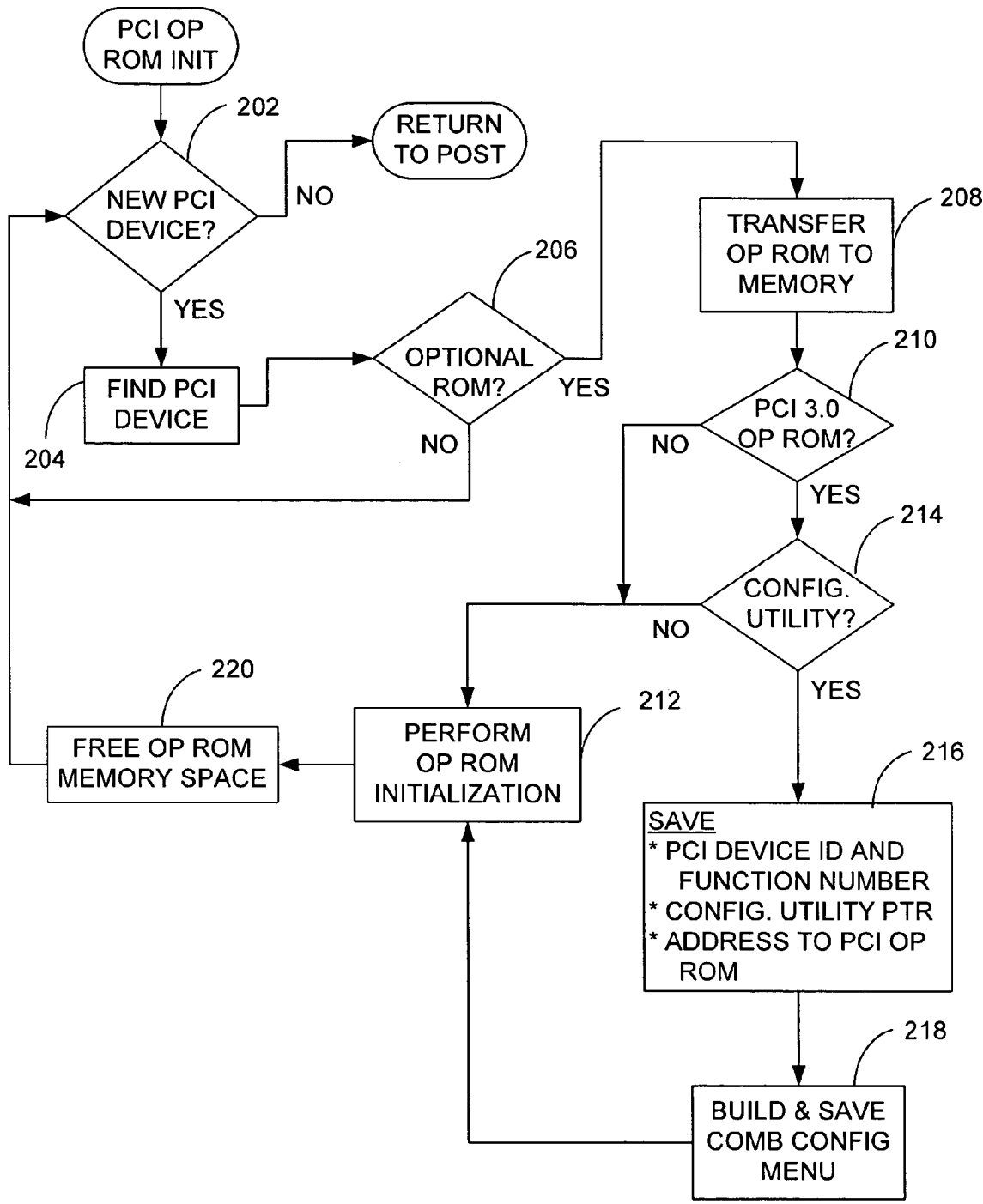
FIG. 2 shows the operational flow for the initialization module 100 of FIG. 1.

FIG. 2 shows the operational flow of the initialization module 100 in FIG. 1. The operational flow in FIG. 2 begins with the new PCI device test operation 202. Test operation 202 is checking for the presence of a new PCI device. New PCI device means the PCI device has not been previously added to the computing system. If there is no new PCI device then the operational flow returns to the POST routine.

If there is a new PCI device, the operational flow branches YES to find operation 204. Find operation 204 finds the PCI device and accesses it. Optional ROM test operation 206 tests whether the PCI device contains an optional ROM (OP ROM) to provide for its own initialization and possibly configuration. If there is no OP ROM in the PCI device then the operational flow returns to new PCI device test operation 202 to look for additional PCI devices.

If the optional ROM test 206 detects that the PCI device has an OP ROM, the operational flow branches YES to transfer the programs in the OP ROM to the memory of the computing system. Transfer operation 208 loads the OP ROM programs into working storage in the memory used by the firmware performing the POST routine.

PCI 3.0 test operation 210 tests whether this OP ROM conforms to the PCI Firmware Specification 3.0. If the OP ROM does not so conform, the operational flow branches NO to perform initialization operation 212. If the PCI OP ROM does conform to the 3.0 specification, the operational flow branches YES to configuration utility test operation 214. Configuration utility test operation 214 detects whether the OP ROM includes a configuration utility. If it does not, the operational flow branches NO to the perform initialization operation 212. If the OP ROM does include a configuration utility, the operational flow branches YES to save operation 216. In effect test operations 210 and 214 have detected whether the OP ROM conforms to the 3.0 specification and contains a configuration utility. If the OP ROM meets these two tests, information to identify the configuration utility is saved, and a combination configuration menu, as shown in FIG. 3, is built and saved.

Save operation 216 saves for each configuration utility three pieces of information. First, it saves the identification of the PCI device related to the configuration utility and the device's function. Second, it saves a pointer to the configuration utility within the programs in the OP ROM of the PCI device. Third it saves a hardware address of the OP ROM at the PCI device. With this information the configurations module 102 (FIG. 1) can later retrieve the configuration utility from the OP ROM in the PCI device.

When the information for the first new PCI 3.0 device is saved, build operation 218 begins to build the combination configuration utility menu by adding the first line to the menu. This line identifies the configuration utility by PCI name and configuration utility name. Stored for this line is the pointer to the configuration utility in the OP ROM at the PCI device, and the address to access that OP ROM at the PCI device. After this entry is made in the menu, the menu is saved by build operation 218. Now, the operational flow passes to perform initialization operation 212.

Perform initialization operation 212 performs the initialization program portion provided by the OP ROM for the new PCI device. In other words, the OP ROM contains at least a first program for initializing the PCI device, and a second program for configuring the PCI device. The perform initialization operation 212 is only executing the initialization program from the OP ROM. After the PCI device has been initialized, free memory space operation 220 frees up the memory space consumed by the OP ROM when it was transferred to the memory by transfer operation 208. The memory space is freed because firmware memory space is limited. The operational flow then returns to the new PCI device test operation 202 to detect any additional PCI device that has newly been added to the computing system. As each new PCI device is found, it is initialized as described above. Further, if it is a PCI 3.0 device with a configuration utility, a line for that utility is added to the combination configuration menu being built by build operation 218. When all new PCI devices have been initialized, test operation 202 branches the operational flow NO and returns the flow to the POST routine.

The initialization module is downward compatible to earlier PCI firmware specification versions in that if there is an OP ROM but it does not meet the 3.0 firmware specification or does not have a configuration utility, the perform initialization operation will execute the initialization program from the OP ROM for the new PCI device.

Figure 4:
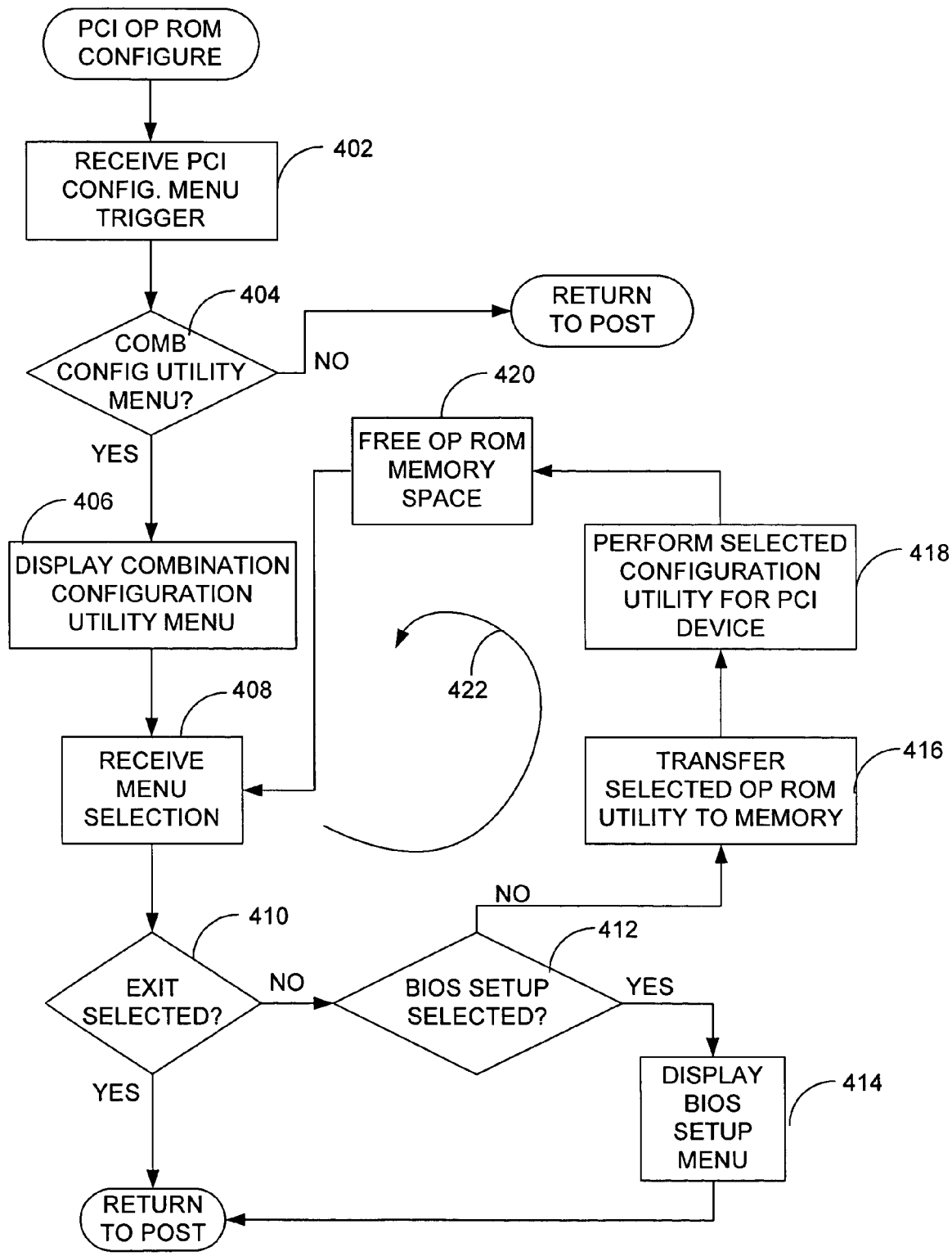
FIG. 4 shows the operational flow of the configurations module 102 of FIG. 1.

FIG. 4 shows the operational flow for the configuration module 102 in FIG. 1. The operations in FIG. 4 begin when receive operation 402 receives a configuration menu trigger. As described earlier the trigger may be a particular hot key pressed by the user or it may be a programmed condition detected by the receive operation 402. That condition as described above could be the completion of operations at the initialization module 100.

Once the configuration menu trigger has been detected then the combination configuration utility menu test operation 404 detects the existence of the menu. If there is no combination utility menu, the operational flow branches NO and returns to the POST routine. If however a menu was created and saved by the initialization module 100 in FIG. 1, the operational flow will branch YES to display menu operation 406.

Display menu operation 406 displays the combination configuration utility menu which is shown in FIG. 3. The menu of FIG. 3 is exemplary. Each of the first five lines or entries of the menu refers to a configuration utility and must convey enough information to the user so that the user will be able to identify the PCI device and the configuration utility for that device.

The configuration utilities are identified by PCI device name and configuration utility name. Since there are five configuration utility entries, in this example there were five new PCI 3.0 devices having a configuration utility added to the computing system. In addition the menu has an entry for BIOS SETUP and an EXIT entry. The purpose of these entries is described in more detail hereinafter.

Receive selection operation 408 receives the selection made by the user. The user might use the arrow keys of the keyboard to index between selections and highlight an entry. Then the user might press a key such as the "enter" to make a selection. Of course other key presses might be used to make selection.

In. FIG. 4, exit selected test operation 410 detects whether the user has selected the EXIT entry in the menu. If the user chooses to bypass some or all of the configuration utilities, or if all configuration utilities have been processed, the user would select the EXIT entry in the menu. In FIG. 4 the exit selection would be detected by test operation 410, and the operational flow would branch YES to return the operational flow to the POST routine. If the user does not select the EXIT entry in the menu, the operational flow branches NO to BIOS setup select test operation 412.

BIOS setup test operation 412 is optional and is used where the menu includes as one of the possible selections a BIOS SETUP entry as illustrated in FIG. 3. If the BIOS SETUP entry is selected, the operational flow will branch YES from test operation 412 to display BIOS setup menu operation 414. In effect the user has elected to bypass one or more of the configuration utilities and use the BIOS setup menu operations to perform the configuration of the new PCI devices. After the BIOS setup menu is displayed the operational flow will return operational flow to the POST routine which will contain the BIOS setup program. If the user does not select the BIOS setup entry, then the operational flow branches NO to transfer configuration utility operation 416. In other words when the test operations 410 and 412 are not satisfied the user will have selected a particular PCI device configuration utility.

Transfer operation 416 transfers the selected PCI device configuration utility to memory from the OP ROM in the PCI device. Perform configuration operation 418 will then perform the selected configuration utility for the PCI device. Once the configuration utility has been completed, the free space operation 420 will free the memory space used by the selected configuration utility program transferred from the PCI device.

The operational flow returns to the receive selection operation 408 from free space operation 420. Receive operation 408 receives the next selection of an entry by the user from the combination configuration menu in FIG. 3. The program loop 422 will then repeat and continue until the user has selected EXIT or has selected BIOS SETUP. Alternatively, the user may process all of the configuration utilities identified in the combination configuration menu and then select EXIT to return the operational flow to the POST routine.

The logical operations of the various embodiments of the present invention are implemented (1) as a sequence of computer-implemented acts or program modules running on a computer system and/or as interconnected machine logic circuits or circuit modules within the computing system. The implementation is a matter of choice dependent on the performance and cost requirement of the computing system implementing the invention. Accordingly the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

While the invention has been particularly shown and described with reference to preferred embodiments thereof, it will be further understood in the art that various other changes in the form and details may be made therein without departing from the spirit and scope of the invention.

What is claimed is:

1. In a computing system, a method for adding at least one PCI device to the computing system during at least one POST operation performed by the computing system, the method comprising:

detecting a plurality of new PCI devices, and if at least one of the plurality of new PCI devices has an optional ROM (OP ROM), collecting identification information and location information on all configuration utilities in the OP ROM of the at least one of the plurality of new PCI devices and detecting whether the OP ROM contains information that may be used to add the identification information to a first and a second version of a combination configuration utility menu;

initializing a plurality of new PCI devices;

detecting a triggering event comprising completion of initializing the plurality of new PCI devices;

determining whether the OP ROM of any of the plurality of new PCI devices conform to a firmware specification specific to a firmware of the computing system;

for each of the plurality of new PCI devices, upon determining that the OP ROM of any of the plurality of new PCI devices conforms to the firmware specification, building a combination configuration utility menu from the identification information and location information collected from all of the plurality of new PCI devices, wherein the combination configuration utility menu includes representations of the configuration utilities for each of the plurality of new PCI devices that meets the firmware specification of the firmware of the computing system;

in response to receiving a first user input, presenting to the user a first version of the combination configuration utility menu, wherein the first version of the combination configuration utility menu includes a Basic Input/Output System (BIOS) SETUP entry and respective setup entries for the plurality of new PCI devices, wherein the BIOS SETUP entry is responsive to a user selection to initiate a setup routine provided by a BIOS to configure at least a first one of the plurality of new PCI devices, and wherein the respective setup entries are responsive to a user selection to initiate the configuration utilities provided with the plurality of new PCI devices;

in response to receiving at least a second user input, wherein the second user input comprises a pre-defined hot key, presenting at least a second version of the combination configuration utility menu, wherein the second version of the combination configuration utility menu includes the respective setup entries for the plurality of new PCI devices and not the BIOS SETUP entry; and configuring at least the first one of the plurality of new PCI devices using the setup routine provided by the BIOS when the user selects the BIOS SETUP entry, and configuring at least the first one of the plurality of new PCI devices using the configuration utility provided with the first one of the plurality of new PCI devices, when the user selects the setup entry corresponding to the first one of the plurality of new PCI devices from the combination configuration utility menu.

2. The method of claim 1 wherein the triggering event is a hot key press, wherein the first user input represents activation of a first hot key, and wherein the second user input represents activation of a second hot key.

3. The method of claim 1 wherein the first and the second versions of the combination configuration utility menu include an EXIT entry so that the user may select to exit the act of configuration after executing any or none of the configuration utilities.

4. The method of claim 1 further comprising:
detecting whether the PCI device has a configuration utility.

5. A system for adding at least one PCI device to a computing system during a POST routine that powers up the computing system, the system comprising at least one memory that further comprises:
an initialization module detecting at least one new PCI device, and if the new PCI device has an optional ROM (OP ROM), collecting identification information and location information on all configuration utilities in the OP ROM of the at least one new PCI device and detecting whether the OP ROM contains information that may be used to add the identification information to a first and a second version of a combination configuration utility menu;
the initialization module adding the identification information and location information collected from the OP ROM of the at least one new PCI device to the combination configuration utility menu, wherein the combination configuration utility menu includes a representation of the configuration utilities for each of the at least one new PCI devices that have an OP ROM, and initializing the new PCI device;
a configuration module detecting a first triggering event comprising completion of initialization of all new PCI devices by the initialization module and in response thereto, displaying, to a user of the computing system, a first version of the combination configuration utility menu, wherein the first version of the combination configuration utility menu includes a Basic Input/Output System (BIOS) SETUP entry and at least one further setup entry for at least one new PCI device, wherein the BIOS SETUP entry is responsive to a user selection to initiate a setup routine provided by the BIOS to configure at least one of the new PCI devices, and wherein the at least one further setup entry is responsive to user selection to initiate the configuration utility provided with the at least one new PCI device;
the configuration module detecting at least a second triggering event, wherein the second triggering event comprises a press of a predefined second key, and displaying at least the second version of the combination configuration utility menu in response, wherein the second version of the combination configuration utility menu includes at least one of the setup entries for the at least one new PCI device and not the BIOS SETUP entry; and
the configuration module configuring the new PCI device using the setup routine provided by the BIOS when the BIOS SETUP entry is selected by the user, and configuring the at least one new PCI device using the configuration utility provided with the at least one new PCI device when at least one of the further setup entries is selected by the user.

6. The system of claim 5 wherein the first triggering event is a press of a predefined first key.

7. The system of claim 5 wherein:
the configuration module in response to selection of the BIOS SETUP entry by the user displays a BIOS setup menu and returns program control to the POST routine.

8. The system of claim 5 wherein the first and the second versions of the combination configuration utility menu include an EXIT entry.

9. The system of claim 8 wherein:
the configuration module in response to selection of the EXIT entry by the user returns program control to the POST routine.

10. A computer storage medium having computer-executable instructions stored thereupon for adding at least one PCI device to a computing system during a POST routine that powers up the computing system, the computer-executable instructions comprising:
an initialization module capable of detecting at least one new PCI device, and configured to detect whether an optional (OP) ROM provided by the at least one new PCI device contains information that may be used to add identification information to a first version and a second version of a combination configuration utility menu and further capable of collecting identification information and location information on all configuration utilities in the OP ROM of the at least one new PCI device, the initialization module further capable of adding the identification information and location information collected from the OP ROM of the at least one new PCI device to the combination configuration utility menu, wherein the combination configuration utility menu includes a representation of the configuration utilities for each of the at least one new PCI devices that have an OP ROM, and initializing the at least one new PCI device; and
a configuration module capable of detecting a first triggering event comprising completion of initialization of all new PCI devices by the initialization module and in response thereto, to display to a user of the computing system, the first version of the combination configuration utility menu, wherein the first version of the combination configuration utility menu includes a Basic Input/Output System (BIOS) SETUP entry and at least one further setup entry for at least one new PCI device, wherein the BIOS SETUP entry is responsive to a user selection to initiate a setup routine provided by the BIOS to configure at least one new PCI device, and wherein at least one of the further setup entries is responsive to user selection to initiate the configuration utility provided with the at least one new PCI device, the configuration module also capable of detecting at least a second triggering event, wherein the second triggering event comprises a press of a predefined second key, and capable of displaying the second version of the combination configuration utility menu in response thereto, wherein the second version of the combination configuration utility menu includes at least one of the setup entries for the at least one new PCI device and not the BIOS SETUP entry, the configuration module further capable of configuring the at least one new PCI device using the setup routine provided by the BIOS when the BIOS SETUP entry is selected by the user, and capable of configuring the at least one new PCI device using the configuration utility provided by the at least one new PCI device when at least one of the further setup entries is selected by the user.

* * * * *